US 3,778,483

METHODS FOR THE MANUFACTURE OF
MACROCYCLIC COMPOUNDS
Joseph J. Becker, Geneva, Karl-Heinrich Schulte-Elte,
Chatelaine, Geneva, and Gunther Ohloff, Bernex,
Geneva, Switzerland, assignors to Firmenich S.A.,
Geneva, Switzerland
No Drawing. Original application Dec. 7, 1967, Ser. No.
688,684. Divided and this application June 25, 1971,
Ser. No. 156,966
Int. Cl. C07c 13/32
U.S. Cl. 260—666 PY                  2 Claims

ABSTRACT OF THE DISCLOSURE

The present invention relates to a new method for the manufacture of macrocyclic compounds, in particular of cyclopentadecanone ("Exaltone"; registered trademark) and a 3-methyl-cyclopentadecan-1-one (muscone). These ketones are odoriferous substances, known per se, which have a musk odor and are indispensable in the perfume industry.

---

This application is a division of our application Ser. No. 688,684, filed Dec. 7, 1967.

There are already several known methods for the manufacture of "Exaltone" and muscone which, however, are not satisfactory because they either comprise numerous steps and yield only small quantities of the desired products, or they start from difficulty accessible, expensive starting materials.

It was, therefore, the object of the present invention to provide new and simpler synthetic methods for the manufacture of "Exaltone" and muscone from easily accessible and cheap starting materials.

It is the object of the present invention to provide a method for the manufacture of macrocyclic compounds which comprises catalytically hydrogenating unsaturated cyclic ketones having the formula

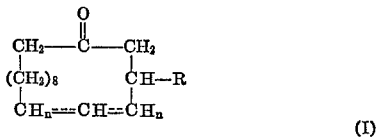

(I)

wherein R represents hydrogen or the methyl radical and one of the symbols $n$ is the integer 1 and the other the integer 2, and wherein the double bond has the cis- or the trans-configuration.

The unsaturated ketones of Formula I are new substances which, as such, possess interesting olfactive properties. Their odor is considerably stronger than that of the corresponding saturated ketones. Whereas the latter develop a characteristic musk odor, the unsaturated ketones in which R is hydrogen have an odor reminiscent of civettone, and the unsaturated ketones in which R is methyl have a more woody odor.

The use of the unsaturated ketones of Formula I as odoriferous substances and/or fixatives is also an object of the invention.

Moreover, the invention relates to a method for the manufacture of macrocyclic compounds which comprises catalytically hydrogenating cyclic ketones having the formulae:

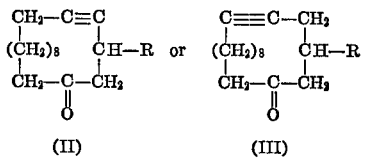

(II)         (III)

wherein R represents hydrogen or the methyl radical, in order to obtain the corresponding saturated ketones.

The cyclic ketones having Formulae II and III are new compounds.

The catalytic hydrogenation of the cyclic ketones having Formula I can be carried out according to known methods, e.g. by using Raney nickel or noble metals as catalysts. The hydrogenation can take place at barometric pressure or elevated pressures, and at room temperature or at elevated temperatures.

The catalytic hydrogenation of the ynones corresponding to Formulae II and III is preferably carried out by means of Raney nickel at barometric pressure and room temperature.

The unsaturated cyclic ketones corresponding to Formula I can be obtained, according to the invention, from di-ketones having the formula

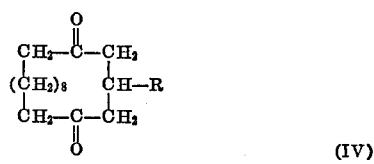

(IV)

wherein R represents hydrogen or the methyl radical, by partially reducing the di-ketones and treating the resulting keto alcohols with dehydrating agents. The di-ketones IV are new compounds which possess interesting olfactive properties.

The partial reduction of the di-ketones IV can be carried out e.g. by catalytic hydrogenation by means of Raney nickel at room temperature and barometric pressure, or elevated pressure, using 1 mole of hydrogen per 1 mole of di-ketone. The hydrogenation is advantageously carried out in an alkaline medium, e.g. in methanol containing NaOH. The partial catalytic hydrogenation of the di-ketones IV can also be carried out by means of noble metal catalysts, possibly in an acidic medium. Acidic agents, such as mineral acids, e.g. boric acid, phosphoric acid or sulfuric acid, acidic salts, e.g. potassium hydrogen sulfate or potassium hydrogen phosphate, or aromatic sulfonic acids, e.g. benzene or p-toluene sulfonic acids, can be used for dehydrating the keto alcohols forming in the hydrogenation.

The unsaturated cyclic ketones I can also be obtained, according to the invention, by irradiating unsaturated bicyclic hydrocarbons corresponding to the formula

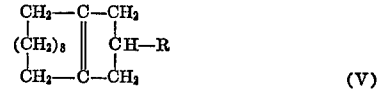

(V)

wherein R represents hydrogen or the methyl radical, in the presence of an oxygen-transferring sensitizer to obtain a mixture of hydroperoxides having the formulae

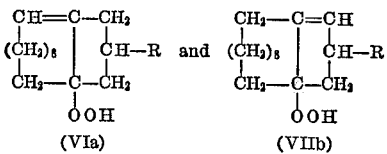

(VIa)           (VIIb)

reacting the mixture of hydroperoxides VIa and VIb with diborane, and oxidizing the reaction product, e.g. with $H_2O_2$, to form a mixture of diols having the formulae

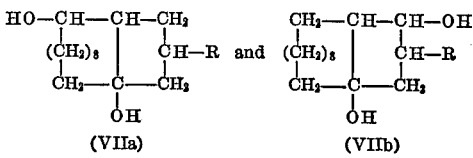

(VIIa)          (VIIb)

converting the mixture of diols VIIa and VIIb by reaction with tosyl chloride into a mixture of mono-tosylates, and treating the resulting mono-tosylate mixture with a strong alkali, e.g. potassium tert. butoxide.

The diols VIIa and VVIIb are new compounds.

The unsaturated cyclic ketones I can also be obtained, according to the invention, by catalytically partially hydrogenating the ynones corresponding to Formulae II and III, using 1 mole of hydrogen per 1 mole of ketone and as a catalyst, e.g. a partially deactivated palladium-charcoal catalyst.

The compounds having the formula

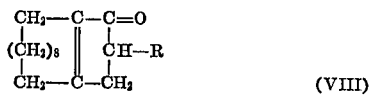
(VIII)

wherein R represents hydrogen or the methyl radical, are key substances for the preparation of the intermediates corresponding to Formulae II, IV, VIIa and VIIb. The compound of Formula VIII with R=CH₃ is a new compound.

Starting from cyclododecanone the compounds corresponding to Formula VIII can be prepared according to two different methods (A and B) which are described hereinafter schematically:

Method A

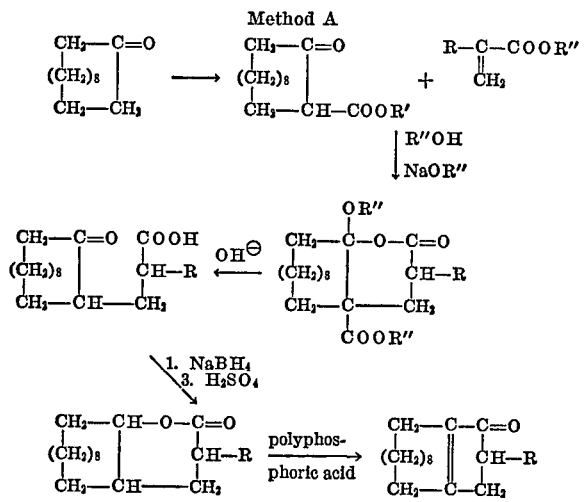

R=hydrogen or methyl; R'=lower alkyl: e.g. methyl or ethyl; R''=lower alkyl: e.g. methyl or ethyl.

Method B

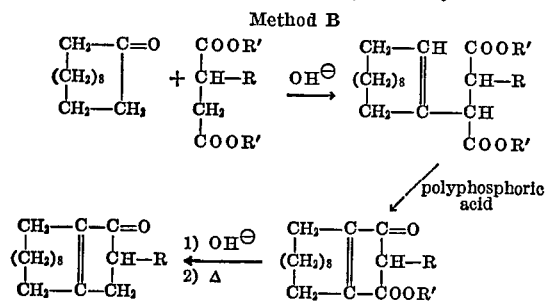

R=hydrogen or methyl; R'=lower alkyl: e.g. methyl or ethyl.

By epoxidation of compounds VIII, reaction of the epoxides with tosyl hydrazine and fragmentation of the tosyl hydrazones compounds corresponding to Formula II are obtained, as is shown in the following reaction scheme:

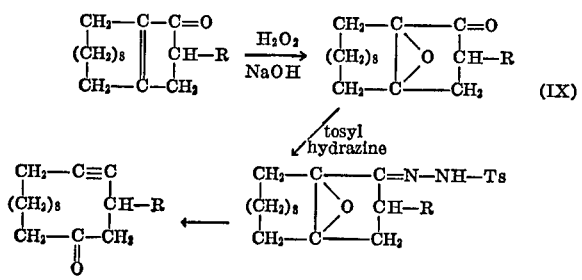

The epoxides IX are new compounds which possess interesting olfactive properties and have moreover a fixative effect.

From the compounds corresponding to Formula VIII compounds having the formula

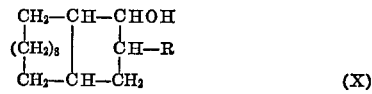
(X)

can be prepared e.g. by catalytic hydrogenation by means of Raney nickel at room temperature and barometric pressure, or elevated pressure, e.g. in an alkaline medium, using 2 moles of hydrogen per 1 mole of unsaturated ketone VIII.

By dehydration of compounds X and isomerization of the resulting double bond by means of acidic agents compounds corresponding to the formula

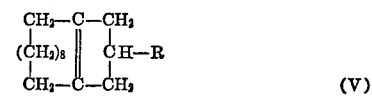
(V)

can be obtained. Inorganic acids, such as sulfuric or phosphoric acids, or acid salts, such as potassium hydrogen sulfate, or aromatic sulfonic acids, such as benzene or p-toluene sulfonic acids, can be used, e.g., as dehydrating and isomerizing acidic agents.

The di-ketones IV can be prepared from the compounds V by oxidation with cleavage of the bridge double bond. The oxidation and cleavage of the bridge double bond can be carried out, e.g., by ozonization, for example in alcoholic medium, such as methanol, and reductive cleavage of the ozonization product, for example by means of sodium sulfite or triphenyl phosphine or by hydrogenolysis by means of a palladium-charcoal catalyst.

The oxidation of compounds V can also take place by using potassium permanganate. A further method for the manufacture of the di-ketones IV from the compounds V consists in epoxidizing the latter, hydrolyzing the resulting epoxides corresponding to the formula

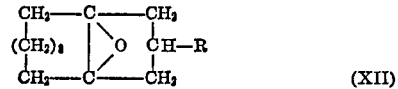
(XII)

and cleaving the resulting saturated bicyclic α,β-glycols with glycol-splitting oxidation agents, such as potassium permanganate, lead tetracetate or perhaloacids. Furthermore, the di-ketones IV can be obtained by subjecting the compounds V to a photo-sensitized oxidation with molecular oxygen in the presence of oxygen-transferring sensitizers, e.g. Rose Bengale, and treating the resulting mixture of hydroperoxides (Formulae VIa and VIb) with a Bronsted or Lewis acid or with an agent which is capable of being converted from a lower to a higher oxidation stage, such as FeSO₄, or with heat.

The epoxides XI are new compounds which possess olfactive properties and have a fixative effect.

The compound corresponding to Formula VIII wherein R=methyl, viz 14-methyl-bicyclo[10.3.0]pentadec-1(12)-en-13-one, can also be obtained by first reacting bicyclo[10.3.0]pentadec-1(12)-en-13-one with a dialkyl carbonate, e.g. diethyl carbonate, and then with an alkyl halide, e.g. methyl iodide, and saponifying the resulting reaction product under decarboxylating conditions, or by converting bicyclo[10.3.0]pentadec-1(12)-en-13-one into the corresponding en-amine by reaction with an organic base, reacting the en-amine with an alkyl halide, and finally treating the reaction product with an agent regenerating the carbonyl group.

Cyclododecanone, which is the starting material for the syntheses described hereinbefore, has exceptional advantages over the starting materials hitherto used for the synthesis of macrocyclic odoriferous substances having 15 ring members. Cyclododecanone is accessible in excellent purity and in unlimited amounts at very low costs.

The ring enlargement of cyclododecanone to comprise 15

EXAMPLE 1

22 g. of a mixture consisting mainly of the transisomers of cyclopentadec-4-en-1-one and cyclopentadec-5-en-1-one (B.P. 102°/0.03 mm. Hg; M.P. 30–33°) are dissolved in 250 ml. of methanol, to the solution are added 2 ml. of 10% aqueous sodium hydroxide and 5 g. of Raney nickel in the form of a 30% suspension in ethanol, and the mixture is shaken with hydrogen at room temperature and barometric pressure. The hydrogenation is interrupted when the theoretically required amount of hydrogen is absorbed, which takes about 30 minutes. The residue obtained by filtering off the catalyst and evaporation of the solvent is taken up in 200 ml. of toluene. The solution is washed neutral with water and dried over sodium sulphate. By evaporation of the solvent and distillation of the residue at 100–102°/0.03 mm. Hg cyclopentadecanone having an M.P. of 63–65° is obtained in a yield of 95–98%.

The ketone mixture used as starting material can be prepared in the manner described in Example 7.

EXAMPLE 2

23.5 g. of a mixture consisting mainly of the trans-isomers of 3-methyl-cyclopentadec-4-en-1-one and 3-methyl-cyclopentadec-5-en-1-one are hydrogenated in the manner described in Example 1 to obtain, after working up of the hydrogenation mixture and distillation of the residue, in a yield of about 95%, racemic 3-methyl-cyclopentadecan-1-one having the following physical properties:

$$d_4^{15}=0.924; \; n_D^{15}=1.481$$

The semicarbazone of the ketone melts at 134°.

The ketone mixture used as starting material can be obtained from 3-methyl-cyclopentadecan-1,5-dione in the manner described in Example 7.

EXAMPLE 3

22 g. of cis-cyclopentadec-4-en-1-one are hydrogenated in the manner described in Example 1 to obtain, after working up the hydrogenation mixture and distillation of the residue, in a yield of about 95%, cyclopentadecanone which is identical with the product obtained according to Example 1.

The cis-cyclopentadec-4-en-1-one used as starting material can be prepared as follows:

220 mg. of cyclopentadec-4-yn-1-one are hydrogenated in ethanol by means of 220 mg. of palladium-charcoal catalyst poisoned with pyridine until 1 mole of hydrogen is absorbed. After filtering off the catalyst and removal of the alcohol there are obtained 212 mg. of crude product which is distilled in a bulb tube at 80°/0.01 mm. Hg. 204 mg. of a colorless oil, $n_D^{20}=1.4914$, which tends to crystallize on standing (M.P. 41–42°) and consists of cis-cyclopentadec-4-en-1-one are obtained. The product shows a purity of 98.5% in the gas-chromatographic analysis. IR spectrum: bands at 3020, 2925, 2880, 1713, 1652 (shoulder) and 710 cm.$^{-1}$.

Cyclopentadec-4-yn-1-one can be obtained according to the method described hereinafter:

11 g. of bicyclo[10.3.0]pentadec-1(12)-en-13-one prepared according to Example 19 are dissolved in 1 litre of methanol; 6 ml. of 6 N sodium hydroxide solution and 25 ml. of 30% hydrogen peroxide are added, and the solution is stirred at room temperature for 24 hours. The reaction solution is poured into 4 litres of ice water and extracted several times with methylene chloride. The extract is washed neutral with sodium chloride solution, dried over sodium sulfate and the solvent is removed. There are thus obtained 9.1 g. of crude product. 9 g. of this product are subjected to chromatography on 30 times the amount of silicagel (Merck: particle size 0.05–0.2 mm.) using a hexane-ether mixture in a voluminal ratio of 9:1. 6.32 g. of pure 1,12-epoxy-bicyclo[10.3.0]pentadecan-13-one having the following physical properties: B.P. 120°/0.06 mm. Hg; $n_D^{20}=1.5043$; $\lambda_{max}=303$ m$\mu$, $\epsilon=45$; IR spectrum: 1742 cm.$^{-1}$ (unconjugated carbonyl group), are isolated from the eluate.

5.9 g. of the obtained epoxy-ketone are dissolved in 20 ml. of ethanol, a solution of 5.0 g. of tosyl hydrazine in 20 ml. of ethanol is added, and the total solution is allowed to stand at room temperature for 40 hours. The reaction mixture is poured into water and extracted with ether. The extract is extracted twice with sodium chloride solution and then dried over sodium sulfate. After removal of the ether there are obtained 9.8 g. of a yellow oil containing the tosyl hydrazone of 1,12-epoxy-bicyclo [10.3.0]pentadecan-13-one which is further processed without any additional purification.

.4g 5o.fthepn,-t ;wardPse$_{55}$ 4.5 g. of the obtained tosyl hydrazone in ether are slowly applied to a column of 135 g. of silicagel (Merck; particle size 0.05–0.2 mm.) in hexane. There is an instantaneous strong nitrogen evolution. The elution is carried out by means of 2 litres of an ether-hexane mixture 4:1. Cyclopentadec-4-yn-1-one of M.P. 40–42° is obtained in a yield of about 70%.

EXAMPLE 4

23.5 g. of 3 - methyl - cis - cyclopentadec - 4 - en - 1-one are hydrogenated in the manner described in Example 1 to obtain, after working up of the hydrogenation mixture and distillation of the residue, in a yield of about 95%, 3-methylcyclopentadecan-1-one which is identical with the product obtained according to Example 2.

The 3-methyl-cyclopentadec-4-en-1-one used as starting material can be prepared from 3-methyl-cyclopentadec-4-yn-1-one in the manner described in Example 3.

3-methyl-cyclopentadec - 4 - yl-1-one can be prepared from the corresponding 3-methyl - 1,12 - epoxy-bicyclo [10.3.0]pentadecan-13-one in the manner described in Example 3.

EXAMPLE 5

To a slurry of a spatula point of pre-hydrogenated Raney nickel in 10 ml. of pure methanol is added a solution of 1.5 g. of cyclopentadec-4-yn-1-one in 20 ml. of methanol, and the mixture is shaken under the action of hydrogen until the absorption of gas practically finishes. After filtering off the catalyst and removal of the solvent 1.4 g. of hydrogenation product are obtained which crystallize spontaneously after distillation in a bulb tube. There is thus obtained cyclopentadecanone which has an M.P. of 63–65° and does not show any depression of the melting point in admixture (1:1) with an authentic sample of the ketone.

In the IR spectrum of this hydrogenation product there is no indication of the presence of an acetylene or ethylene bond. However, just as is the case with the starting material, there is a strong absorption of a carbonyl group at about 1710 cm.$^{-1}$.

The monocyclic acetylenic ketone used as starting material can be prepared in the manner described in Example 3.

EXAMPLE 6

3-methyl-cyclopentadec-4-yn-1-one is hydrogenated in the manner described in Example 5 to obtain 3-methyl-cyclopentadecan-1-one which is identical with the product prepared according to Example 2.

The yn-one used as starting material can be prepared in the manner described in Examples 3 and 4.

EXAMPLE 7

119 g. of cyclopentadecan-1,5-dione (0.5 mole) obtained according to Examples 8–13, 2500 ml. of methanol 50 g. of Raney nickel in the form of a 30% alcoholic suspension and 25 ml. of 10% sodium hydroxide solution are charged into a circular flask having a volume of 4 litres and being equipped for hydrogenations. The mixture is shaken for about 45 minutes at room temperature and barometric pressure in a hydrogen atmosphere whereby 12.5 l. of hydrogen (theoretically required amount=11.2 l. of $H_2$ at 0°/760 mm.) are absorbed.

The hydrogenation mixture is filtered whereupon the solvent is evaporated by distillation under reduced pressure. The residue is diluted with toluene and ether and then washed with 10% aqueous sodium bicarbonate and water. After drying over sodium sulfate the solvent is evaporated under reduced pressure. There are thus obtained 120 g. of a product containing cyclopentadecan-5-ol-1-one in a predominant proportion.

The crude cyclopentadecan-5-ol-1-one (120 g.), 2500 ml. of toluene and 5 g. of 70% benzenesulfonic acid are charged into a flask of 4 l. volume and equipped with stirrer, thermometer, reflux condenser and water separator. The reaction mixture is refluxed for ¼ hour with stirring and then decanted. The organic phase is washed with 10% sodium bicarbonate solution and then dried over sodium sulfate. After evaporation of the solvent the residue is distilled. There are thus obtained 92.2 g. of a product distilling over at 116–155°/0.03 mm. Hg and consisting predominantly of a mixture of cyclopentadec-4-en-1-one and cyclopentadec-5-en-1-one, in which mixture the proportion of the trans-isomers exceeds that of the cis-isomers.

The obtained crude product can be purified as follows: To a solution of 92.2 g. of crude cyclopentadec-4- and -5-en-1-one in 600 ml. of ethanol are added 40 g. of semicarbazide hydrochloride in 200 ml. 20% sodium acetate solution in a wide-necked flask of 2 l. volume. The mixture is heated for ¼ hour at 45° and then allowed to stand over night in the refrigerator. The precipitated crystalline product is distilled by suction and then washed with cooled ethanol, distilled water and then with ethanol. The product is dried in a drying cupboard at 100° under reduced pressure. There are thus obtained 75.1 g. (yield 94.1%) of semicarbazone melting at about 175°.

A mixture of 300 ml. of 80% phosphoric acid and 75.1 g. of the semicarbazone of cyclopentadec-4- and -5-en-1-one is stirred for 30 minutes at room temperature. The reaction mixture is diluted with water and extracted with toluene. The organic phase is first washed with water, then with 10% aqueous sodium carbonate solution and dried over sodium sulfate. By evaporation of the solvent under reduced pressure there are obtained 60.1 g. of crude cyclopentadec-4- and -5-en-1-one which is distilled in a Vigreux column of 15 cm. height. There are thus obtained 55.6 g. of a mixture of pure cyclopentadec-4- and -5-en-1-one which distills over at 100–102°/0.003 mm. Hg and in which the proportion of the trans-isomers is preponderant. Yield of pure product: 50%, based on the used diketone.

EXAMPLE 8

A solution of 20.6 g. (0.1 mole) of bicyclo[10.3.0]pentadec-1(12)-ene and 0.2 g. of Rose Bengale in 50 ml. of methanol and 50 ml. of benzene is irradiated by means of a mercury high pressure lamp (type Philips HPK 125 w.) in an irradiation apparatus of conventional construction (cf. e.g. G. O. Schenck in A. Schönberg "Preparative Organic Photo Chemistry," Springer edition, Göttingen 1958) while pure oxygen is passed through at 20°. The reaction is completed after about 70 minutes with an absorption of 2300 ml. of oxygen. After evaporation of the solvent in vacuo at a bath temperature of 40° there are obtained 23 g. (about 93% of the theoretical yield) of a partially crystalline mixture of 1-hydroperoxy-bicyclo[10.3.0]pentadec-12(13)-ene and 1-hydroperoxy-bicyclo[10.3.0]pentadec-11(12)-ene. With KI/glacial acetic acid this product shows a positive hydroperoxide reaction (iodine precipitation). IR spectrum: 3400 cm.$^{-1}$ (assoc. OOH valence); 815 cm.$^{-1}$ (trisubst. C=C group).

20 g. of the crude hydroperoxide mixture are dissolved in 200 ml. of absol. ether. To the solution is added dropwise, while cooling with ice and stirring, 0.5 ml. of 40% $BF_3$ etherate. The reaction mixture is further stirred for 2 hours at room temperature and then decomposed by the addition of 10% aqueous sodium bicarbonate solution. From the separated ethereal phase there are obtained 20 g. crude product which is distilled. There are obtained 16.5 g. of an oily product which distils over at 50–130°/0.01 mm. Hg and from which 11 g. of crystalline cyclopentadecan-1,5-dione are obtained. M.P. 60–62°. Yield: 55% of theory.

EXAMPLE 9

20 g. of the crude hydroperoxide mixture prepared according to Example 8 are dissolved in 50 ml. of glacial acetic acid, and 1–5 drops of conc. sulfuric acid are added to the solution. The instantaneous exothermic reaction is controlled by cooloing with ice in such a manner that the temperature does not exceed 20°. After about 20 minutes 5 more drops of conc. sulfuric acid are added, and the reaction mixture is stirred for 2 hours at room temperature. After the addition of 2 g. of sodium acetate the glacial acetic acid is distilled off in vacuo. The residue is taken up in 100 ml. of ether, and the solution is extracted several times with diluted sodium bicarbonate solution. By working up in the usual manner there are obtained 19 g. of an oily product from which 8.5 g. (43% of theory) of a cyclopentadecan-1,5-dione melting at 60–62° are obtained by fractional distillation at 0.01 mm. Hg.

EXAMPLE 10

To a solution of 20 g. of bicyclo[10.3.0]pentadec-1(12)-ene in a mixture of 40 ml. of acetone and 40 ml. of glacial acetic acid is added dropwise, while cooling (below 15°) and stirring in the course of 1 hour, a solution of 28 g. of potassium permanganate in a mixture of 400 ml. of acetone and 40 ml. of water. The reaction mixture is stirred for 2 hours, the separated manganese dioxide is filtered by suction and the filtrate is washed with acetone. The filtrate is concentrated in vacuo, whereupon the residue is taken up in ether, and the solution is washed with aqueous sodium bicarbonate and then with water and finally again concentrated. 17.5 g. of a partially crystalline residue are obtained from which 11 g. of pure cyclopentadecan-1,5-dione of M.P. 60–62° are recovered by distillation. Moreover 6 g. of pure bicyclo[10.3.0]pentadecan-1,12-cis-diol of M.P. 87° are isolated which, if reacted with lead tetracetate in the manner described in Example 13, yield a further 5.2 g. of cyclopentadecan-1,5-dione.

EXAMPLE 11

The diborane developed by the dropwise addition of 60 g. of 40% boron fluoride etherate to 12 g. of sodium borohydride in diglyme is slowly introduced into a solution of 23.8 g. of a hydroperoxide mixture prepared according to Example 8 in 300 ml. of absolute tetrahydrofuran, the solution being cooled to 0° and kept in an inert atmosphere ($N_2$). After stirring for 1 hour a mixture of 100 g. of 12% ethanolic potassium hydroxide and 25 g. of 30% hydrogen peroxide is added to the reaction mixture, while cooling, and the reaction mixture is further stirred for 2 hours. By working up the reaction mixture according to conventional methods there are obtained 18.5 g. (75% of theory) of a mixture of bicyclo[10.3.0]pentadecan-1,11-diol and bicyclo[10.3.0]cyclopentadecan-1,13-diol which has a tendency to crystallize. The IR spectrum of this product shows an OH valence stretching at 3450 cm.$^{-1}$ and besides does not show any indication for C=C double bonds.

2 g. of the diol mixture dried in vacuo are dissolved in 30 ml. of absolute pyridine, and 2.0 g. of toluene sulfanylchloride are added thereto portionwise. The solution is allowed to stand for 2 days at room temperature and is then poured into water. The separated oil is taken up in ether, whereupon the ethereal solution is washed with diluted sodium bicarbonate solution and the solvent is evaporated. 3.8 g. of a partially crystalline mixture of the mono-tosyl diols are obtained.

2.0 g. of the tosylate mixture are mixed with 20 ml. of absolute tert. butanol and 3 g. of sodium ethoxide and the mixture is refluxed for 2 hours with exclusion of humidity. After evaporation of the tert. butanol in vacuo the residue is taken up in 100 ml. of water, and the solution is extracted with 50 ml. of ether. By working up of the extract there is obtained 0.9 g. of an oily product, 72% of which, according to gas-chromatographic analysis, consists of a mixture of cyclopentadec-4-en-1-one and cyclopentadec-5-en-1-one. By hydrogenation in the manner described in Example 1, this mixture can be converted into cyclopentadecanone.

EXAMPLE 12

103.1 g. (0.5 mole) of bicyclo[10.3.0]pentadec-1(12)-ene and 1.5 litres of methylene chloride are charged into a cylindrical reaction vessel which is equipped with stirrer, thermometer as well as inlets and outlets for gases and whose outlet is immersed in a potassium iodide solution. Into the solution is introduced, while cooling to $-10°$, an ozone-oxygen mixture at the rate of 20 litres per hour (corresponding to 3 g. of ozone per hour). After 6 hours the reaction is interrupted and the ozonization mixture is allowed to stand overnight at $-10°$.

To the ozonization mixture kept at 15° is added a suspension of 10% palladium-charcoal catalyst (containing 0.8 g. of palladium) in 50 ml. of methylene chloride, and the mixture is shaken in a hydrogen atmosphere in a 3-litre flask. The hydrogenation is interrupted after 18 hours when 8 litres of hydrogen have been absorbed. The crude product obtained by filtering off the catalyst and evaporation of the solvent is subjected to a fractional distillation at 0.04 mm. Hg. There are obtained 78.8 g. of a fraction which boils at 120–140° and which crystallized on standing. By recrystallization of this product from petroleum ether there are obtained 78.8 g. of pure cyclopentan-1,5-dione of M.P. 60–62°. Yield: 65.6% of theory.

10.5 g. of bicyclo[10.3.0]pentadec-1(12)-ene in 100 ml. of solvent mixture—consisting of 80 parts of anhydrous methanol and 20 parts of methylene chloride—are treated with ozone for 1 hour under the conditions described hereinbefore in this example. The completely ozonized solution is then added dropwise to an aqueous solution of 25 g. of crystal-water containing sodium sulfite in 250 ml. of water, while stirring vigorously and cooling externally. When the organic phase does no longer show the presence of peroxide the former is separated in a separating funnel after the addition of 100 ml. of petroleum ether. After working up in the usual manner there are obtained 10.8 g. of pure cyclopentan-1,5-dione of M.P. 60–62°.

EXAMPLE 13

20.6 g. (0.1 mole) of bicyclo[10.3.0]pentadec-1(12)-ene are dissolved in 300 ml. of 90% formic acid, and to the solution are added dropwise at a temperature of 40° 5 g. of 55% hydrogen peroxide, whereupon the solution is further stirred at 40° for 8 hours and then allowed to stand overnight. The formic acid is distilled off under reduced pressure, whereupon, the residue is taken up in 50 ml. of ethanol. To the solution are added 25 ml. of 10% aqueous potassium hydroxide, and the solution is stirred for 4 hours at room temperature. The reaction mixture is diluted with 150 ml. of water and extracted with ether. By removing the solvent by evaporation there are obtained from the ether extract 22 g. of crude bicyclo[10.3.0]pentadecan-1,12-diol which tends to crystallize.

The crude diol is dissolved in 300 ml. of glycial acetic acid, and to the solution are added in small portions, at 45–60°, 15 g. of $Pb_3O_4$. The reaction mixture is stirred for 8 hours at 45–60° and then allowed to stand overnight. After evaporation of the acetic acid under reduced pressure the residue is taken up in 200 ml. of water, 20 g. of calcium carbonate are added to the solution, the mixture is shaken and finally 200 ml. of petroleum ether (boiling range 80–100°) are added. The reaction mixture is filtered and the filtrate decanted. The organic phase is distilled under reduced pressure in order to remove the solvent, whereupon the residue is distilled at 0.03 mm. Hg. The product obtained in this manner, which crystallizes on standing, is recrystallized from petroleum ether. There are obtained 14.6 g. of cyclopentadecan-1,5-dione melting at 60–62°.

EXAMPLE 14

22.0 g. (0.1 mole) of bicyclo[10.3.0]pentadec-1(12)-en-13-one are dissolved in 200 ml. of glacial acetic aicd, and to the solution is added 0.8 g. of platinum oxide. The mixture is subjected to a hydrogen pressure of 50 atmospheres in an autoclave of 500 ml. volume. The hydrogenation is interrupted after 3 hours. The hydrogenation mixture is filtered and the acetic acid is evaporated under reduced pressure. The residue is distilled at 0.03 mm. Hg, whereby 20 g. (96%) of bicyclo[10.3.0]pentadecane of M.P. 80°/0.03 mm. Hg are obtained.

EXAMPLE 15

A mixture of 110.1 g. (0.5 mole) of bicyclo[10.3.0]-pentadec-1(12)-en-13-one, 1 litre of methanol, 40 g. of a 30% alcoholic Raney nickel suspension and 16 ml. of 10% sodium hydroxide solution is hydrogenated at room temperature in a 2-litre shaking flask. After 10 hours the hydrogenation is completed after the absorption of the calculated amount of 21 litres of hydrogen. The catalyst is removed from the hydrogenation mixture by filtration, and the solvent is evaporated in vacuo. The residue is dissolved in ethyl acetate, acidified with 30 ml. of glacial acetic acid and worked up in the usual manner. There are thus obtained 108 g. of a bicyclo[10.3.0]pentadecan-13-ol melting at 94–100°. After recrystallization from methanol the main portion of the saturated bicyclic alcohol melts at 104–105°.

EXAMPLE 16

108 g. of the crude bicyclo[10.3.0]pentadecan-13-ol obtained according to Example 14 or 15, 500 ml. of toluene and 10 g. of 70% benzenesulfonic acid are charged into a 2-litre volume three-necked flask equipped with stirrer, thermometer, reflux condenser and water separator. The reaction mixture is refluxed for 4 hours with stirring. 11 ml. of water are collected in the separator. The reaction mixture is cooled to room temperature and washed with 200 ml. of 10% aqueous sodium bicarbonate solution and then with water until it is neutral. After drying over sodium sulfate and removal of the solvent under reduced pressure (12 mm. Hg there are obtained 100 g. of crude product which is subjected to a fractional distillation. There are obtained 91.2 g. of a fraction distilling at 75–80°/0.04 mm. Hg and consisting of bicyclo[10.3.0]pentadec-1(12)-ene.

EXAMPLE 17

22.2 g. (0.1 mole) of cis-cyclopentadec-4-en-1-one are dissolved in 300 ml. of benzene, and to the solution are added 5 g. of diphenyl disulfide. The solution is irradiated for 48 hours by means of a mercury high pressure lamp (type Philips HKP 125 w. in an irradiation apparatus of conventional construction (cf. e.g. G. O. Schenk in A. Schönberg "Preparative organic photochemistry," Springer editions, Göttingen 1958). The reaction mixture is worked up in the usual manner whereby a product consisting of about 90% of trans-cyclopentadec-4-en-1-one is obtained.

EXAMPLE 18

58 g. of sodium methoxide in 1 litre of tert, butanol are warmed to 60° and a solution of 160 g. of methylsuccinic acid ester and 111.5 g. of cyclododecanone are added in a nitrogen atmosphere within ½ hour while stirring vigorously. A temperature rise up to 70° is noticed. After refluxing for 5 hours 20% hydrochloric acid is added to the cooled solution until the reaction is acid, and the solvent is removed in a rotatory evaporator.

The residue is taken up in a suitable solvent such as ether, the organic phase is shaken with water until it is free of chloride, and the solvent is removed from the reaction product. There are thus obtained 124 g. of condensation product. Without any further purification this semi-ester is heated for 2 hours, while stirring vigorously, with 500 g. of polyphosphoric acid at 80–90°, whereby the organic compound is added portionwise to the acid within 1 hour. The obtained reaction product is poured into 2 litres of ice water in such a manner that the temperature does not exceed 50° and is then extracted with 500 ml. of ether. There are thus obtained 78 g. of a cyclisation product which is heated for 2 hours with 500 ml. of a 15% aqueous potassium hydroxide solution at reflux temperature. After acidification with 20% hydrochloric acid and extraction with ether and distillation of the reaction product from which the solvent has been removed, there are obtained 60 g. of a 14-methyl-bicyclo[10.3.0]pentadec-1(12-en-13-one. B.P. 121–124°/0.05 mm. Hg; $n_D^{20}$ =1.5062; $d_4^{20}$=0.9583; IR spectrum: 1693 cm.$^{-1}$ (conjugated carbonyl group), 1635 cm.$^{-1}$ (conjugated double bond).

EXAMPLE 19

508 g. of 2-ethoxycarbonyl-cyclododecan-1-one, obtained according to conventional conditions by reaction of cyclododecanone with diethyl carbonate in the presence of sodium methoxide in a yield of 96%, 2400 ml. of methanol and 514 g. of methyl acrylate are charged into a 6-litre flask equipped with stirrer, thermometer and reflux condenser. Then a solution of 30 g. of sodium methoxide in 300 ml. of methanol is added within 45 minutes while stirring. The reaction mixture is further stirred for 10 hours at room temperature. By evaporation of the solvent there are obtained 729 g. of compound which, after crystallization from petroleum ether, melts at 67–69° and has the following structure:

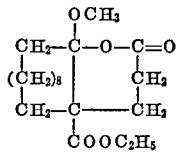

To the obtained crude product there is added at 60–70° within 1 hour, while stirring, a mixture of 800 ml. of 30% sodium hydroxide solution and 200 ml. of H$_2$O. The reaction mixture is refluxed for 3 hours at 80° and stirred.

To the reaction mixture is added at 80° 200 g. of 12% sodium boron hydride, and it is stirred for 15 hours at 80°. After repeated addition of 100 g. of 12% sodium boron hydride the reaction mixture is further stirred for 33 hours at 80°. Then the reaction mixture is slowly acidified at 80° with 1625 ml. of 50% H$_2$SO$_4$ and then extracted with 2000 ml. of toluene. The extract is washed neutral with water. By evaporation of the solvent there are obtained 487 g. of the corresponding δ-lactone having 15 carbon atoms.

To the lactone (487 g.) are added, while stirring, 2400 g. of polyphosphoric acid heated to 50°. The reaction mixture is heated for 1 hour at 95–97° and stirred, then poured into 3000 ml. of ice water and extracted with 500 ml. of toluene. The extract is washed neutral with water. By evaporation of the solvent under reduced pressure there are obtained 440.5 g. of crude product which is purified by fractional distillation. There are obtained 283 g. of bicyclo[10.3.0]pentadec-1(12)-en-13-one which distils at 125–130°/0.03 mm. Hg and possesses the following physical properties: M.P. 29.5°; $n_D^{20}$=1.5278; $d_4^{20}$=1.011.

EXAMPLE 20

A 2-litre volume flask equipped with stirrer, thermometer and reflux condenser is charged with 254.4 g. (1 mole) of 2-ethoxy-carbonyl-cyclododecan-1-one, 800 ml. of methanol and 15 g. of sodium methoxide. Then 400 g. of methyl methacrylate are added, with stirring, at 60° within 19 hours. The reaction mixture is further stirred for 6 hours at 60°, whereupon the methanol is evaporated under reduced pressure and the residue is taken up in toluene. The solution is diluted with water, acidified with 50 ml. of glacial acetic acid, then stirred for 10 minutes and finally decanted. The organic phase is washed neutral with water. By evaporation of the solvent under reduced pressure there are obtained 318 g. of crude product which is subjected to a fractional distillation. There are obtained 213 g. of a fraction distilling at 116°/0.03 mm. Hg and crystallizing on standing. By recrystallization of this fraction from 200 g. of petroleum ether there are obtained 100 g. of the ester melting at 97–101° and having the formula:

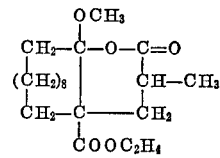

The obtained 100 g. of ester are added to 800 ml. of water and 100 ml. of 30% sodium borohydride solution in a flask equipped with stirrer, thermometer and reflux condenser. The reaction mixture is heated for 4 hours to 80° while stirring. Subsequently, 50 g. of 12% sodium hydride are added to the reaction mixture at 80°, and it is stirred at 80° for 7 hours. Then, there are again added 50 g. of sodium boron hydride, and the reaction mixture is stirred for 14 hours at 80°. After a repeated addition of 50 g. of sodium boron hydride the reaction mixture is further stirred for 34 hours at 80°. Then the reaction mixture is slowly acidified at 80° with 400 ml. of 50% sulfuric acid and extracted with toluene. The organic phase is washed neutral with water, and the solvent is then distilled under reduced pressure. There are obtained 77 g. of lactone of M.P. 85–86° and having the formula:

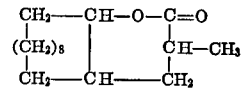

480 g. of polyphosphoric acid are heated to 50°, the lactone (77 g.) is added, and the reaction mixture is heated for 1 hour at about 100°, with occasional stirring. The reaction mixture is then poured into 800 ml. of ice water and extracted with 300 ml. of toluene. The extract is washed neutral with water. By distilling off the solvent under reduced pressure 69 g. of crude product are obtained which is purified by fractional distillation. There are thus obtained 48.5 g. of 14-methyl-bicyclo[10.3.0] pentadec-1(12)-en-13-one distilling at 109–112°/0.03 mm. Hg and having the following physical properties: B.P. 110–112°/0.03 mm. Hg; $n_D^{20}$=1.5118; $d_4^{20}$=0.9910.

EXAMPLE 21

58 g. of sodium methoxide in 1 litre of tert. butanol are heated to 60°, and then a solution of 160 g. of methylsuccinic acid ester and 111.5 g. of cyclododecanone is added within ½ hour, while stirring vigorously, in a nitrogen atmosphere. A temperature rise up to 70° is noticeable. After refluxing for 5 hours, 20% hydrochloric acid is added to the cooled solution until the reaction is acid, and the solvent is removed in a rotatory evaporator.

The residue is taken up in a suitable solvent, such as ether, the organic phase is shaken with water until it is free of chloride, and the solvent is removed from the reaction product. There are thus obtained 124 g. of condensation product. Without any further purification this semi-ester is heated with 500 g. of polyphosphoric acid at 80–90° for 2 hours, while stirring vigorously, whereby the organic compound is added portionwise to the acid in the course of 1 hour. The obtained reaction product is poured into 2 litres of ice water in such a manner that the temperature does not exceed 50°, and extracted with 500 ml. of ether. There are thus obtained 78 g. of a cyclization product which is refluxed for 2 hours with 500 ml. of a 15% aqueous potassium hydroxide solution. After acidification with 20% hydrochloric acid, extraction with ether and distillation of the reaction product from which the solvent has been removed there are obtained 60 g. of 14-methyl - bicyclo[10.3.0]pentadec - 1(12)-en-13-one, B.P. 121–124°/0.05 mm. Hg; $n_D^{20}=1.5062$; $d_4^{20}=0.9583$; IR spectrum: 1693 cm.$^{-1}$ (conjugated carbonyl group), 1635 cm.$^{-1}$ (conjugated double bond).

EXAMPLE 22

220.3 g. (1 mole) of bicyclo[10.3.0]pentadec-1(12)-en-13-one are dissolved in 240 g. (2.03 moles) of diethyl carbonate and added dropwise, while stirring at 50–55°, within 2 hours, to a mixture of 720 g. (6.01 moles) of diethyl carbonate and 108 g. of sodium methoxide (2 moles). In a weak vacuum of 80 mm. Hg the methanol which forms is first and the excess diethyl carbonate is afterwards slowly distilled off. Then the viscous reaction product is diluted with toluene and stirred for 3 days at room temperature with 142 g. (1 mole) of methyl iodide. After removal of the solvent, the crude reaction product is saponified with 10% sodium hydroxide solution, acidified and the precipitated organic layer is extracted with toluene. After removal of the solvent the crude reaction product is purified by a distillation in vacuo. Yield: 80 g. of pure 14-methyl-bicyclo[10.3.0] pentadec-1(12)-en-13-one. Constants: B.P. 110–112°/0.03 mm. Hg; $n_D^{20}=1.5118$; $d_4^{20}=0.9910$.

We claim:
1. A process for the preparation of unsaturated bicyclic hydrocarbons having the formula

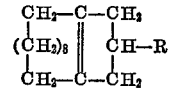

wherein R represents hydrogen or the methyl radical which comprises hydrogenating an unsaturated bicyclic ketone having the formula

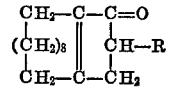

wherein R has the meaning set forth above, by means of Raney nickel as the catalyst, at room temperature and barometric pressure or elevated pressure, in an alkaline medium using 2 moles of hydrogen per 1 mole of unsaturated ketone to produce a saturated bicyclic alcohol, and treating the resulting saturated bicyclic alcohol with an acidic agent causing dehydration and isomerization of the resulting double bond.

2. Process according to claim 1 in which the acidic agent is an inorganic acid or an acid salt thereof or an aromatic sulfonic acid or a mixture of an inorganic acid with an organic acid.

References Cited

Wagner, Zook, Synthetic Organic Chemistry, Wiley, New York, 5th printing, 1965, p. 32.

DELBERT E. GANTZ, Primary Examiner

V. O'KEEFE, Assistant Examiner

U.S. Cl. X.R.

10—666 A